US008881028B2

(12) United States Patent
Klinger et al.

(10) Patent No.: US 8,881,028 B2
(45) Date of Patent: Nov. 4, 2014

(54) REVERSE METADATA VIEWING BY MULTIPLE PARTIES

(75) Inventors: Tamir Klinger, Brooklyn, NY (US); Jacquelyn A. Martino, Cold Spring, NY (US); Paul M. Matchen, Briarcliff Manor, NY (US); Peri L. Tarr, Hawthorne, NY (US); Patrick Wagstrom, White Plains, NY (US); Clay E. Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 13/308,966

(22) Filed: Dec. 1, 2011

(65) Prior Publication Data

US 2013/0145285 A1 Jun. 6, 2013

(51) Int. Cl.
*G06F 3/00* (2006.01)
(52) U.S. Cl.
USPC ........... 715/753; 715/703; 715/733; 715/738; 715/739; 715/811

(58) Field of Classification Search
None
See application file for complete search history.

(56) References Cited

U.S. PATENT DOCUMENTS

| 8,171,128 | B2 * | 5/2012 | Zuckerberg et al. | 709/224 |
| 8,316,056 | B2 * | 11/2012 | Wable | 707/791 |
| 8,495,143 | B2 * | 7/2013 | Zhou et al. | 709/204 |
| 8,522,152 | B2 * | 8/2013 | Baldwin et al. | 715/751 |
| 2005/0267766 | A1 * | 12/2005 | Galbreath et al. | 705/1 |
| 2010/0268830 | A1 * | 10/2010 | McKee et al. | 709/228 |
| 2011/0202617 | A1 * | 8/2011 | Naidu et al. | 709/206 |
| 2013/0124322 | A1 * | 5/2013 | Boland et al. | 705/14.58 |

* cited by examiner

*Primary Examiner* — Anil N Kumar
(74) *Attorney, Agent, or Firm* — Scully, Scott, Murphy & Presser, P.C.; Louis J. Percello, Esq.

(57) ABSTRACT

Reverse metadata viewing by multiple parties, in one aspect, determines one or more second users that share one or more concerns of the first user, enable the first user to select said one or more second users. One or more concerns of said selected one or more second users are determined based on metadata information in electronic artifacts associated with said selected one or more second users. The first user is enabled to explore said one or more concerns of said selected one or more second users.

17 Claims, 3 Drawing Sheets

REVERSE METADATA VIEWING BY MULTIPLE PARTIES

FIELD

The present application relates generally to computers and programming development and analysis, and more particularly to reverse metadata viewing by multiple parties.

BACKGROUND

Many system users may share a topic of interest, and depending on the viewpoint from which a user is looking at the topic of interest, different aspects of the topic become more prominent. Similarly, many system users may work on the same project, but the users have different concerns and may place importance on different aspects of the project, for example, depending on the role a user has in the project, or the user's goals or commitments. Sometimes, however, it may be useful to view the same topic of interest from a different angle, that is, from a different user's viewpoint or perspective.

BRIEF SUMMARY

Methods and system for reverse metadata viewing by multiple parties are provided. The method for reverse metadata viewing, in one aspect, may include receiving one or more concerns of a first user. The method may also include determining one or more second users that share one or more concerns of the first user. The method may further include enabling the first user to select one or more second users. The method may yet further include determining one or more concerns of the selected one or more second users based on metadata information in electronic artifacts associated with the selected one or more second users. The method may still further include enabling the first user to explore one or more concerns of the selected one or more second users.

In another aspect, a method for reverse metadata viewing by multiple parties may include receiving one or more concerns of a first user. The method may also include determining one or more second users that share one or more concerns of the first user. The method may further include enabling the first user to select from the determined one or more second users. The method may yet further include determining one or more concerns of the selected one or more second users based on metadata information in electronic artifacts associated with the selected one or more second users. The method may still further include enabling the first user to explore one or more concerns of the selected one or more second users.

A system for reverse metadata viewing by multiple parties, in one aspect, may include a module operable to identify one or more second users that share one or more concerns of a first user. The module may be further operable to enable the first user to select from the identified one or more second users. The module may be further operable to determine one or more concerns of the selected one or more second users based on metadata information in electronic artifacts associated with the selected one or more second users. The module may be further operable to enable the first user to explore one or more concerns of the selected one or more second users.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
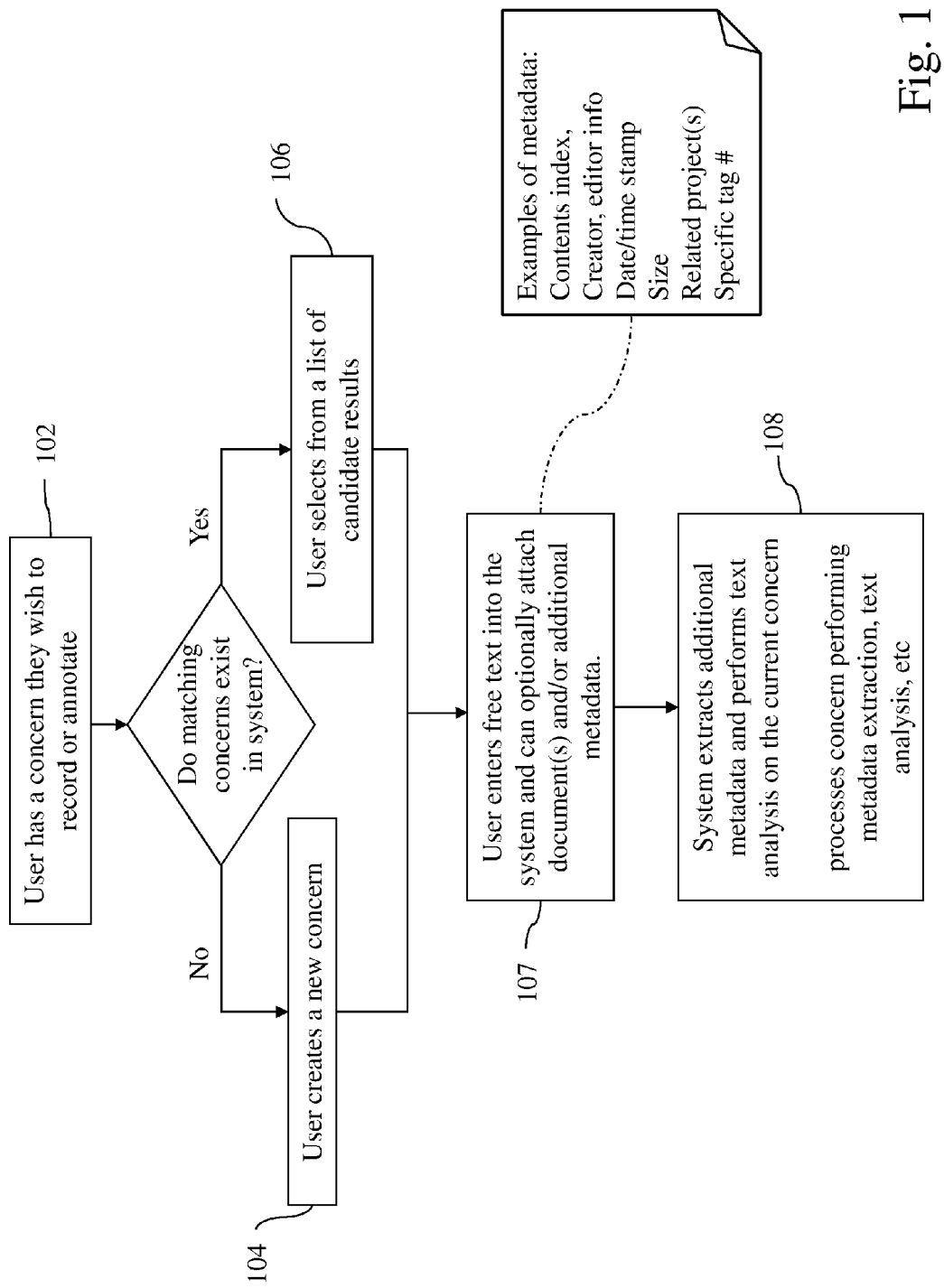
FIG. 1 is a flow diagram illustrating an example of how a system of the present disclosure in one embodiment gets data in preparation for reverse angle access.

Reverse metadata viewing by multiple parties of the present disclosure in one embodiment allows a user, e.g., referred to as User 1, to view his or her concerns from the viewpoint of another user, e.g., referred to as User 2, thus enabling User 1 to identify what should be his or her concerns in addition to the concerns he or she has, based on what others, like User 2, are concerned about. More particularly, the methodologies of the present disclosure in one embodiment may semi-automatically identify one or more users who share a concern and/or additional users with the greatest overlap with the concerns that User 1 has. User 1 then may explore and understand other users' concerns based on User 1's perspective.

In one aspect, the methodologies of the present disclosure provide dynamic filtering on a world of concerns that allows not just exploring, but also automatically helping a user (e.g., User 1) in understanding the relationship between that user's point of view and another user's (e.g., User 2) point of view, but biased toward User 1 because, for example, that is what makes it useful to User 1. Additionally, the methodologies of the present disclosure may provide the ability of a third user, User 3, to see the shared concern space/relationship between User 1 and User 2. As an example, User 3 may be a manager of User 1 and User 2, who are working on different components of a project that is managed by User 3.

A "concern" as described herein refers to a topic, item, or subject of interest or the like to a user. In one embodiment of the present disclosure, the methodology may identify one or more other users from whose viewpoints User 1 should be looking at or understanding a "concern". To put it another way, the methodology of the present disclosure in one embodiment may answer the question, "with whom should I be reversing my view angle?" with respect to a concern, or "from whose perspective should I be looking at this concern?"; the methodology of the present disclosure then may perform the reversing of the angle.

As another example, consider a user, e.g., referred to as User 4, who has the role of customer support manager for a software product (e.g., referred to as Application A), and is responsible for ensuring that bugs (errors) in Application A that are reported by customers are addressed to the customers' satisfaction. User 4 might be worried about a concern pertaining to a bug in Application A from the perspective of how the bug impacts the customer. Further, consider for example that another user, e.g., User 1 has the role of development manager for Application A. In that example, User 1 might be worried about concerns from the perspective of how the bugs affect his/her ability to complete and deliver a new version of Application A. These different perspectives and goals will cause User 1 and User 4 to prioritize these two concerns differently. For example, a concern pertaining to a bug that is of high importance to an important customer will be of the utmost concern to User 4, but this concern may be of much lower importance to User 1, because it does not affect User 1's goal of delivering a new version of the software product.

A method and/or a system of the present disclosure in one embodiment, and/or a tool (e.g., a software tool embodying the methodology of the present disclosure in one embodiment) may automatically identify a mismatch in priorities of concerns between users, e.g., in the above example scenario, between User 1 and User 4, the mismatch in priorities of concerns which might lead to a poor outcome. For example, if a bug that is of significant importance to User 4's customer is of low priority to User 1, who must ensure that the bug is fixed, User 1 will not address the concern as quickly as User 4 requires. The methodologies of the present disclosure may alert User 1 and User 4 to the mismatch in their priorities for this concern, enabling the two users to take steps to resolve the difference in priorities before the mismatch results in a late delivery of a bug fix and an angry customer.

As described above, the methodologies, system, and/or tool of the present disclosure may enable users to view the priorities of their concerns from the perspective of other users (referred to in another way as viewing from another or reverse angle). For example, if User 4 is using the system to view User 4's concerns, User 4 may want to know how User 1 has prioritized these concerns. User 4 can query, e.g., via a user interface in a system of the present disclosure to show User 4's concerns from the perspective of User 1. The system of the present disclosure may then present the concerns from User 1's perspective, enabling User 4 to compare how User 4 has prioritized these concerns versus how User 1 has prioritized them.

In one aspect, the methodologies and/or the system of the present disclosure may allow every user to describe/annotate their concerns with tags. In the above example, User 4 is concerned about bugs that adversely affect customers. User 4, via for example a system of the present disclosure in one embodiment may annotate the high-priority bug concern with the tags, e.g., "#bug #customer #critsit #ApplicationA #version5.0," where #bug describes the error, #customer describes the customer, #critsit describes critical aspect of the bug, and #Application A specifies the software application. User 1 is concerned about major features of the software that have been scheduled for the next release. User 1, using for example the system of the present disclosure in one embodiment, may annotate appropriate concerns with the tags, e.g., "#feature #version5.1 #ApplicationA #architecture," where #feature specifies the feature of interest, #version5.1 describes the version of the software, #ApplicationA identifies the software application, and #architecture specifies the type of software architecture. The methodologies and/or the system of the present disclosure may identify all concerns in which each user is an active participant and analyze the set of tags associated with these concerns to produce information about each user's context. The context information enables the methodologies and/or the system of the present disclosure to recommend to each user other concerns that may be relevant to them. For example, a salesperson for the software Application A could use the system to learn what features Application A version 5.0 has scheduled for inclusion, and that the currently deployed version of Application A has some serious bugs that have caused recent critsit (critical situation) for customers. The salesperson can also determine who else is interested in Application A, and what priority the development team members have put on addressing the critical bugs, so that the salesperson can determine whether these issues endanger potential sales to new customers. The salesperson can adapt his/her behavior accordingly.

The methodologies and/or system of the present disclosure in one embodiment can help users identify concerns that pertain to their roles, goals, and commitments. The concerns may be presented to a user, prioritized by that user's context. For example, User 2 may have a role of architect on the Application project. User 2 may be interested in concerns pertaining the design of Application A. Because User 2 is an architect, the methodology and/or system may rank concerns that pertain to technical issues in Application A's design higher for the architect than it would rank concerns that pertain to the budgetary consequences of Application A's design. In other words, the methodology and/or system of the present disclosure in one embodiment may infer each user's context and filter and prioritize concerns based on their relevance to a given user's context. To do this, the methodology and/or system of the present disclosure in one embodiment may collect information about the concerns that each user creates, reads, updates, and monitors. The methodology and/or system of the present disclosure in one embodiment may use a variety of analytics, such as tag frequency and similarity to other users whose context is known, to determine each user's context. For example, the architect may create and interact with concerns that pertain to the technical design of Application A, whereas Application A's product manager (e.g., User 3) may create and interact with concerns that pertain to the delivery schedule and budget of Application A. The methodology and/or system of the present disclosure in one embodiment may infer that the architect is working in an "architect context," whereas the product manager is working in a "manager context." Based on this information, when the architect issues a query to find concerns about "Application A design," the methodology and/or system of the present disclosure in one embodiment may prioritize concerns pertaining to technical design issues that go along with the "architect context" and may attribute or give low priority to concerns pertaining to budgetary or personnel issues that arise from Application A's design. Conversely, when the product manager issues the same query, the methodology and/or system of the present disclosure in one embodiment may prioritize concerns pertaining to "manager context," which may include budgetary and personnel issues, and may de-emphasize technical design issues. The methodology and/or system of the present disclosure in one embodiment may always prioritizes results based on the perspective of the user who asked for the information, unless that user asks for the information from the perspective of another user who is working in a different context. If, for example, the architect asks for "Application design" concerns from the perspective of the product manager, the methodology and/or system of the present disclosure in one embodiment may reverse the angle of the query and show the architect the query results as the product manager would see it instead.

Continuing with the above example, the methodology of the present disclosure may search and identify for User 2 (the architect) one or more other users who may be worried about Application A—in this example, User 3 who has the role of a product manager. User 2 then may be enabled to view or understand User 3's world of concerns, including budgetary and personnel ramifications of design decisions, which may or may not have been one of User 2's concerns associated with the project. This knowledge may help User 2 to consider the impact of User 2's actions more broadly on other enterprise stakeholders.

As another example, User 2 may want to see or know of concerns of others who have one or more concerns that are common with User 2's concerns. For example, User 2 may have an architect's perspective, and would like to identify people who have one or more of the same concerns as User 2, by filtering on one or more of User 2's concerns. User 2 can use the system to ask what other users share the "Application design" concern. This query might indicate that User 3 (the product manager) and User 5 (an architect for a different software product that needs to integrate with Application A) share this concern. User 2 may then be able to explore the space of concerns that User 3 and User 5 have. This embodiment may be useful, for example, in scenarios in which sometimes User 2 would not know with whom to perform the reverse angle query, i.e., from whose perspective User 2 should be looking at the concerns. Thus, in one embodiment, people who share concerns may be identified, and in turn concerns that are specific to, but not shared among, the identified people may be further identified and analyzed. In another embodiment, the shared concern(s) and one or more users may be ranked according to the closeness (or relevance) to the first user with respect to the shared concerns. For example, User 2 and User 5 are both architects, and so their concerns may be more closely related than User 2's and User 3's concerns, since User 3 is a product manager. Closeness or relevance may be measured, e.g., by the degree or number of common objectives, interest or items the users share, e.g., in terms of their role specification, job description or others.

In one embodiment of the present disclosure, the concerns of various users may be identified by detecting tagged artifacts, tag cloud, log of interactions with assets and/or artifact, or combinations thereof. Other methods may be used to identify concerns. In one embodiment of the present disclosure the tags may be weighted or ranked. For instance, a first user's (User 1's) selecting of terms (keywords, tags) may be weighted heavily, for example, if performed frequently, but those same terms may not be weighted at all for a second user (User 2). However, if one of User 1's lightly weighted tags is one of User 2's heavily weighed ones, the method and/or system of the present disclosure in one embodiment may make this fact visible to User 1, for example, signaling to User 1 that his/her light weighted tag might need further considering by the first user. Further, if a party (third user, User 3) is viewing the relationship between User 1 and User 2, User 3 should be able to see the implicit interaction between User 1 and User 2. The method and/or system of the present disclosure in one embodiment may identify such implicit interactions by monitoring actions taken by User 1 as a result of viewing information about User 2. For example, the method and/or system of the present disclosure in one embodiment may, as noted above, show User 1 the fact that User 2 shares some tags in common with User 1. User 1 might click on a link to User 2's tags. The system would record this as an implicit interaction between User 1 and User 2.

As yet another example, consider a scenario where User 1 has tags #1, #2, #3 and #4. Those tags may be descriptive words, for instance, that signal different concerns of User 1. Such tags may be detected, for example, by scraping through a document, natural language processing and/or other methods that can parse and identify tags. A second user, User 2, has tags #2, #4, #7 and #10. A third user, User 3, has tags #2, #4, #10, #50. A fourth user, User 4, has tags #2, #3, #4 and #27. The methodology of the present disclosure in one embodiment may enable User 1 to look for one or more other users that share a concern with User 1, for example, the concern associated with tag #2. Thus, for example, the methodology of the present disclosure in one embodiment may identify User 2, User 3, and User 4 as those having the same tag #2 concern. Analyzing the concerns of those users, the system may further determine that Users 2, 3, and 4 all have tag #4 concern in common, but User 1 does not share this concern. Because the system has already determined that User 1 shares a tag in common with Users 2, 3, and 4, the system may alert User 1 that User 1 should look at tag #4 concern. Similarly, the system may determine that Users 2 and 4 also have tag #10 as concerns in common, and the system may recommend to User 1 that User 1 also look at this tag.

In another embodiment, the method and/or system of the present disclosure may enable a given user, User 1, to look for trending concerns, e.g., concerns that are receiving a lot of attention from other users at present time, and further enable the given user to scope the world of concerns by, for example, individual, organization sector, date, and/or others. For example, the method and/or system of the present disclosure in one embodiment may identify a set of common concerns, and users sharing those concerns, by monitoring which users have read, updated, or otherwise indicated interest in those concerns in the past day. In response to detecting that the number of users who have indicated interest in a given concern crosses a threshold (e.g., 50 users in the past 24 hours), the method and/or system of the present disclosure in one embodiment may identify this concern as a trending concern. As another example, the method and/or system of the present disclosure in one embodiment may identify a set of users as related to one another if they share interest in at least a predetermined number of concerns, e.g., 5 concerns, and it may then report to each of these users the fact that they share these concerns in common. Each of these users may then use the method and/or system of the present disclosure in one embodiment to observe what other concerns they share or do not share.

In another aspect, the methodology of the present disclosure may identify a "lost" or "hidden" concern. For instance, by navigating through the users who share some common concerns, the method and/or system of the present disclosure in one embodiment may identify a concern unique to a user, which might be of importance, that others may have overlooked.

FIG. 1 is a flow diagram illustrating in one embodiment how data may be prepared for reverse angle access. At 102, a user has a concern that the user wishes to record in the system of the present disclosure, or the user may be familiar with a concern that the user wishes to augment with additional information.

At 104, in the event of a new concern, the user utilizes the system of the present disclosure to create a new concern in the system. The user may enter free text to describe the concern. Optionally, the user can attach references to documents and other metadata to the concern.

At 106, in the event of an existing concern the user utilizes the system to navigate to the existing concern. There the user may be presented with the existing free text and metadata entered by other users. The user then optionally may augment this information with additional free text, metadata, or attachments that reflect the user's point of view or knowledge that the user has.

At 108, in both cases the system of the present disclosure in one embodiment may then process the concern by performing metadata extraction, text analysis, and other methods of identifying and monitoring the project. In the process of extracting the metadata and classifying the concern the system of the present disclosure in one embodiment may retain the authorship and temporal information related to all extracted elements.

Examples of metadata include but are not limited to, artifacts that include contents index, creator, editor, the date/timestamp, size, related projects, or other tags in an electronic document.

For instance, a methodology of the present disclosure in one embodiment may determine artifacts such as one or more electronic documents related to the specified one or more users, for instance, electronic mails, electronic files, chat sessions, web pages and other documents associated with the one or more second users, and search those electronic documents to determine one or more concerns associated with the specified one or more second users. In one aspect, web pages such as social networking site pages, blog pages and the like associated with the second users may be scanned or searched to identify metadata associated with the one or more second users' concerns from their perspective. For example, tag clouds that may provide weighted list of terms based on their frequency of appearance or use in sites, pages, or electronic documents used by these users may be leveraged to determine concerns of the one or more second users. Likewise, text parsing or the like technique of the identified electronic documents may be employed to determine the concerns of the one or more second users. This information may also be combined with the access patterns of other users to identify concerns for the first user. For example, roles of people who have accessed a specific document that the first user also accessed may be collected and used to infer the roles to which this document may be important.

Concerns may be identified or extracted through explicit metadata (e.g., hashtags or annotations), through analysis of text (e.g., keyword extraction), or by utilizing any other methods, e.g., recency, weighted graphs, search engine page ranking methods, network analysis, and/or others.

Figure 2:
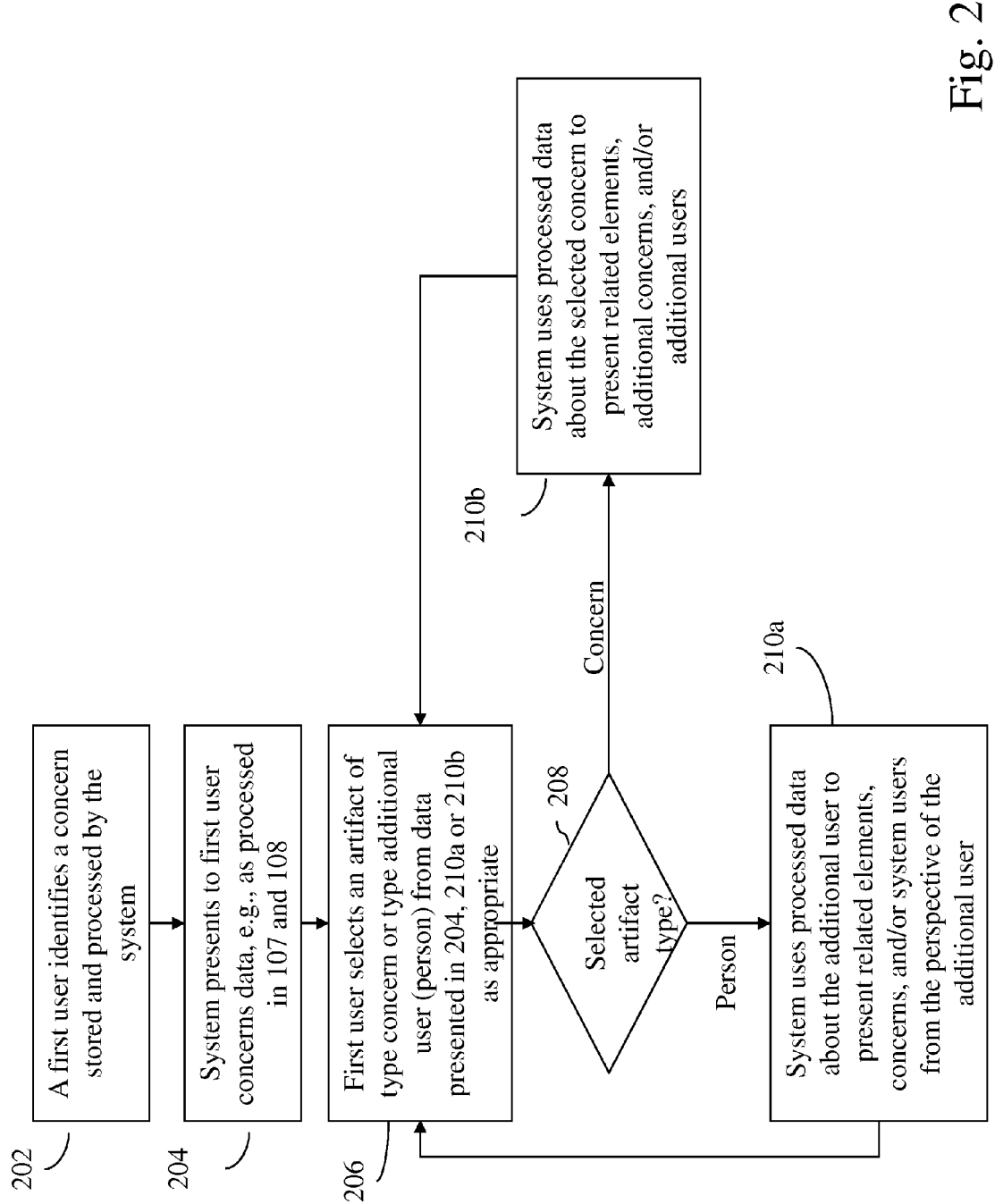
FIG. 2 is a flow diagram illustrating a method of the present disclosure for reverse metadata viewing in one embodiment.

FIG. 2 is a flow diagram illustrating a method of the present disclosure for reverse metadata viewing in one embodiment. At 202, a user (referred to as a first user for clarity) already knows of a concern the user wishes to investigate or the user utilizes the system of the present disclosure in one embodiment to query for an existing concern.

At 204, the system of the present disclosure presents a variety of information about the concern back to the first user. In one embodiment of the system of the present disclosure, the authorship and temporal information is saved for each element of data related to a concern. The system of the present disclosure in one embodiment is able to customize this view, e.g., as a visualization output, based on the elements determined to be most relevant to the first user, for instance, by utilizing methodologies such as most recently used, weighted, graph theoretic clustering, etc. Such visualization may include concerns of the first user and also one or more second users who also have one or more of the same concerns as the first user, and one or more other concerns that those second users have, which may not be indicated as being a concern to the first user.

At 206, based on users that are shown as being related to the concern in step 204, the first user may pick a second user from the set of displayed users to explore. From a list of the concerns shown in step 204, the first user may select one or more additional related concerns to explore.

At 208, if the first user selected one or more second users, the processing continues to 210*a*. If the first user selected one or more concerns, the processing continues to 210*b*.

At 210*a* and 210*b*, the system of the present disclosure may provide visualization as in step 204. At 210*a*, the view may be customized to show the elements most relevant to the second user. In this way the system highlights the most important elements for this second user, showing the concerns from the second user's perspective. At 210*b*, additional concerns, which may not have been the concerns of the first user, are presented along with more details about those concerns, such as who else is sharing those concerns, thus, allowing the first user to further explore, e.g., by way of chaining.

Multiple levels of chaining or iteration may be enabled from step 206 to 210*a* and/or 210*b*, back to step 206. For example, from the one or more of elements presented at 210*a* or 210*b*, a user may select a concern or user at 206. Based on the selection, one or more concerns or users related the selection may be again presented at 210*a* and/or 210*b*. Hence, the selection process at 206 and presentation processes at 210*a* and/or 210*b* may be repeatedly performed.

Figure 3:
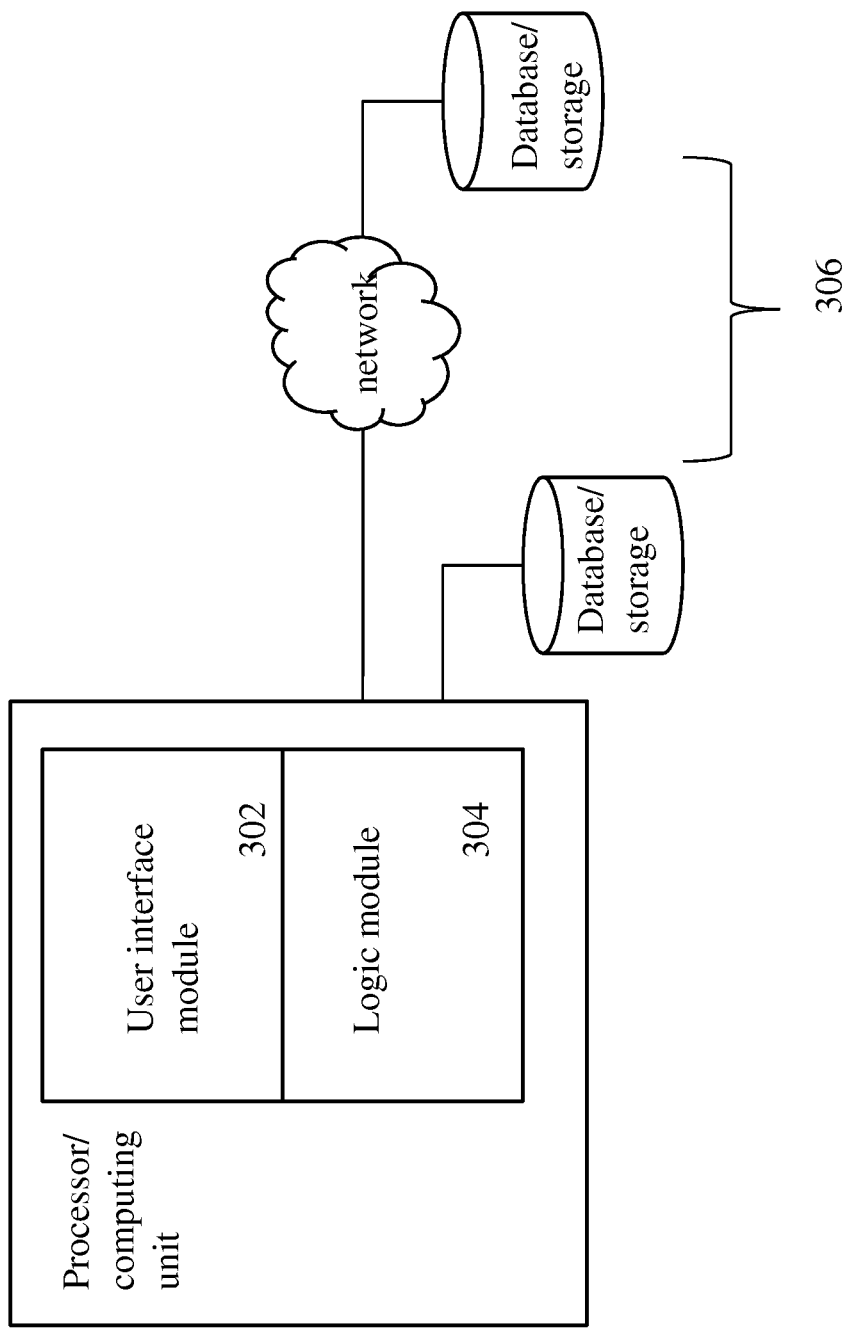
FIG. 3 illustrates components of the present disclosure in one embodiment.

FIG. 3 illustrates system components of the present disclosure in one embodiment. A user interface module 302 receives inputs and presents output to a user. For instance, via the user interface module 302, a first user may input one or more second users whose concerns the first user may be interested in, or information about the first user's own concerns. The user interface module 302 transmits the information to the module 304 executing the logic for identifying the concerns of the one or more second users. The user interface module 302 then may present the identified concerns to the first user. In another aspect, the user interface module may receive as input one or more concerns. The logic module 304 identifies one or more second users who share those concerns. The user interface module 302 may then present the identified one or more second users to the first user for further analysis. The module 302 may search electronic documents stored in various storage devices 306, local or remote, associated with users for determining common concerns, and/or identifying one or more users sharing concerns. The user interface module 302 and the logic module 304 may be executable on a machine, for example, a computer, a processor, a processing core or any other computing machine.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for reverse metadata viewing by multiple parties, comprising:
   receiving from a first user, identifiers of one or more second users;
   identifying one or more electronic artifacts associated with said one or more second users;
   determining one or more concerns of said one or more second users based on metadata information in said one or more electronic artifacts, the one or more concerns comprising a subject of interest, wherein the one or more concerns have preset priorities based on user perspectives of said first user and said one or more second users;
   automatically identifying one or more different perspectives of said one or more second users as related to the one or more concerns to identify mismatch of priorities related to the one or more concerns between the first user and said one or more second users; and
   enabling the first user to explore said one or more concerns of said one or more second users, wherein said enabling the first user to explore said one or more concerns of said one or more second users comprises:
   determining one or more related concerns to said one or more concerns of said one or more second users, and determining one or more related users who has the one or more related concerns; and
   presenting said one or more related concerns and said one or more related users,
   wherein the step of exploring may be repeated based on further related concerns and associated users,
   the method further comprising:
   automatically identifying one or more concerns of the first user, the one or more concerns comprising a subject of interest;
   automatically identifying said one or more second users who share said one or more concerns of the first user;
   allowing the first user to select from said automatically identified one or more second users,
   wherein the receiving step includes receiving from the first user said one or more second users selected by the first user; and
   alerting the first user of a difference in priorities to the one or more concerns between the first user and the second user.

2. The method of claim 1, wherein said one or more electronic artifacts include electronic mail, chat session data, web pages, electronic files, or combinations thereof.

3. The method of claim 1, wherein said metadata information include content index, creator information, editor information, timestamp information, size, tags, or combinations thereof.

4. The method of claim 1, further including:
   building a database of users and concerns storing information associated with said first user and first user's concerns, said one or more second users and one or more second users' concerns, wherein the determining step further determines one or more concerns based on the information stored in the database of users and concerns.

5. A method for reverse metadata viewing by multiple parties, comprising:
   receiving one or more concerns of a first user, the one or more concerns comprising a subject of interest;
   determining one or more second users that share said one or more concerns of the first user;
   enabling the first user to select said one or more second users;

determining one or more concerns of said selected one or more second users based on metadata information in electronic artifacts associated with said selected one or more second users, wherein the one or more concerns have preset priorities based on user perspectives of said first user and said one or more second users;

automatically identifying one or more different perspectives of said one or more second users as related to the one or more concerns to identify mismatch of priorities related to the one or more concerns between the first user and said one or more second users; and enabling the first user to explore said one or more concerns of said selected one or more second users, wherein said enabling the first user to explore said one or more concerns of said selected one or more second users comprises:

determining one or more related concerns to said one or more concerns of said selected one or more second users, and determining one or more related users who has the one or more related concerns; and presenting said one or more related concerns and said one or more related users, wherein the step of exploring may be repeated based on further related concerns and associated users;

the method further comprising:

automatically identifying one or more concerns of the first user; and allowing the first user to select from said automatically identified one or more concerns, wherein the receiving step includes receiving from the first user said one or more concerns selected by the first user; and alerting the user of a difference in the priorities between the first user and the second user.

6. The method of claim 5, wherein said electronic artifacts include electronic mail, chat session data, web pages, electronic files, or combinations thereof, and wherein said metadata information include content index, creator information, editor information, timestamp information, size, tags, or combinations thereof.

7. A non-transitory computer readable storage medium storing a program of instructions executable by a machine to perform a method of reverse metadata viewing by multiple parties, comprising:

receiving from a first user, identifiers of one or more second users;

identifying one or more electronic artifacts associated with said one or more second users;

determining one or more concerns of said one or more second users based on metadata information in said one or more electronic artifacts, wherein the one or more concerns have preset priorities based on user perspectives of said first user and said one or more second users;

automatically identifying one or more different perspectives of said one or more second users as related to the one or more concerns to identify mismatch of priorities related to the one or more concerns between the first user and said one or more second users; and enabling the first user to explore said one or more concerns of said one or more second users, wherein said enabling the first user to explore said one or more concerns of said one or more second users comprises:

determining one or more related concerns to said one or more concerns of said one or more second users, and determining one or more related users who has the one or more related concerns; and presenting said one or more related concerns and said one or more related users, wherein the step of exploring may be repeated based on further related concerns and associated users;

the method further comprising:

automatically identifying one or more concerns of the first user, the one or more concerns comprising a subject of interest;

automatically identifying said one or more second users who share said one or more concerns of the first user; and allowing the first user to select from said automatically identified one or more second users, wherein the receiving step includes receiving from the first user said one or more second users selected by the first user.

8. The non-transitory computer readable storage medium of claim 7, wherein said one or more electronic artifacts include electronic mail, chat session data, web pages, electronic files, or combinations thereof.

9. The non-transitory computer readable storage medium of claim 7, wherein said metadata information include content index, creator information, editor information, timestamp information, size, tags, or combinations thereof.

10. The non-transitory computer readable storage medium of claim 7, further including:

building a database of users and concerns storing information associated with said first user and first user's concerns, said one or more second users and one or more second users' concerns, and wherein the determining step further determines one or more concerns based on the information stored in the database of users and concerns.

11. A non-transitory computer readable storage medium storing a program of instructions executable by a machine to perform a method of reverse metadata viewing by multiple parties, comprising:

receiving one or more concerns of a first user, the one or more concerns comprising a subject of interest;

determining one or more second users that share said one or more concerns of the first user;

enabling the first user to select said one or more second users;

determining one or more concerns of said selected one or more second users based on metadata information in electronic artifacts associated with said selected one or more second users, wherein the one or more concerns have preset priorities based on user perspectives of said first user and said one or more second users;

automatically identifying one or more different perspectives of said one or more second users as related to the one or more concerns to identify mismatch of priorities related to the one or more concerns between the first user and said one or more second users; and enabling the first user to explore said one or more concerns of said selected one or more second users, wherein said enabling the first user to explore said one or more concerns of said selected one or more second users comprises:

determining one or more related concerns to said one or more concerns of said selected one or more second users, and determining one or more related users who has the one or more related concerns; and presenting said one or more related concerns and said one or more related users, wherein the step of exploring may be repeated based on further related concerns and associated users, the method further comprising:
automatically identifying one or more concerns of the first user; and
allowing the first user to select from said automatically identified one or more concerns,
wherein the receiving step includes receiving from the first user said one or more concerns selected by the first user.

12. The non-transitory computer readable storage medium of claim 11 wherein said electronic artifacts include electronic mail, chat session data, web pages, electronic files, or combinations thereof, and wherein said metadata information include content index, creator information, editor information, timestamp information, size, tags, or combinations thereof.

13. A system for reverse metadata viewing by multiple parties, comprising:
a processor;
a module operable to execute on the processor and further operable to automatically identify one or more second users that share one or more concerns of the first user, the one or more concerns comprising a subject of interest, the module further operable to enable the first user to select said one or more second users, and further determine one or more concerns of said selected one or more second users based on metadata information in electronic artifacts associated with said selected one or more second users, wherein the one or more concerns have preset priorities based on user perspectives of said first user and said one or more second users, the module further operable to automatically identify one or more different perspectives of said one or more second users as related to the one or more concerns to identify mismatch of priorities related to the one or more concerns between the first user and said one or more second users, the module further operable to enable the first user to explore said one or more concerns of said selected one or more second users,
wherein the module enables the first user to explore said one or more concerns of said selected one or more second users by at least determining one or more related concerns to said one or more concerns of said selected one or more second users, and determining one or more related users who has the one or more related concerns, and presenting said one or more related concerns and said one or more related users, wherein the step of exploring may be repeated based on further related concerns and associated users;
wherein the module further alerts the first user of a difference in priorities to the one or more concerns between the first user and the second user.

14. The system of claim 13, wherein the first user specifies said one or more second users, and the module is operable to determine one or more concerns of said one or more second users.

15. The system of claim 13, wherein the first user specifies a list of concerns, and the module determines said one or more second users that have the list of concerns.

16. The system of claim 13, further including a user interface module operable to receive input from the first user and further operable to provide a visualization of one or more outputs.

17. The system of claim 13, further including a database of users and concerns storing information associated with said first user and first user's concerns, said one or more second users and one or more second users' concerns.

* * * * *